May 14, 1940.  J. T. BOLEN  2,200,572
WEIGHT INDICATOR AND REGISTER FOR HOISTS
Filed Feb. 28, 1939
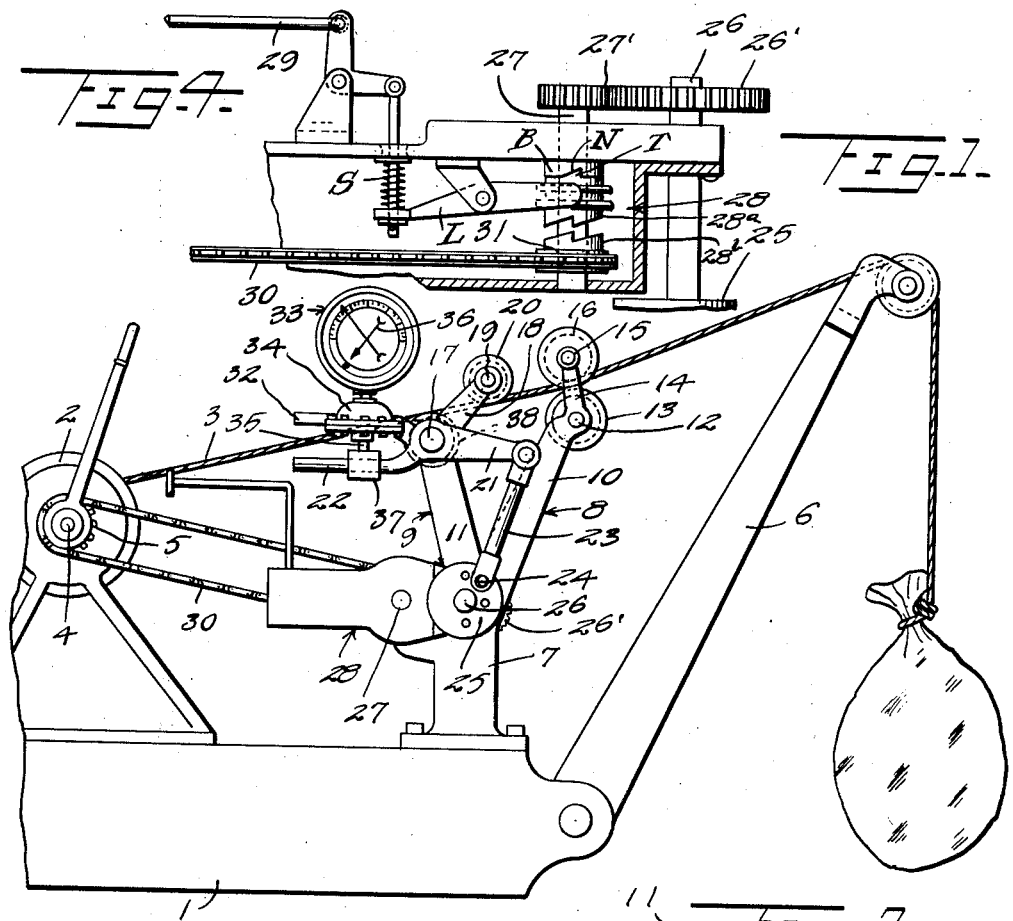
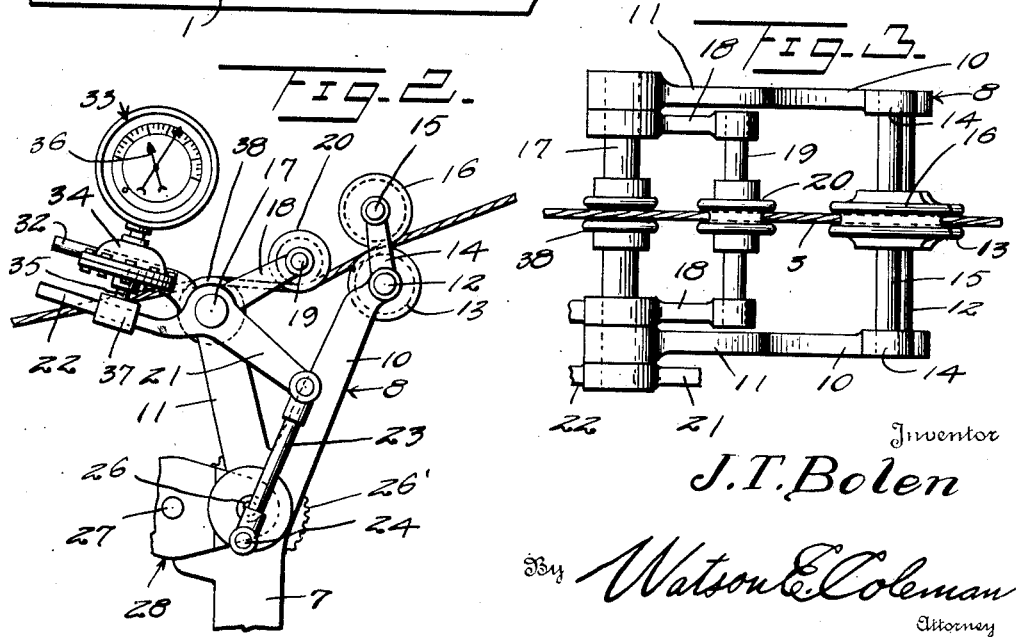
Inventor
J. T. Bolen
By Watson E. Coleman
Attorney Patented May 14, 1940

2,200,572

UNITED STATES PATENT OFFICE 2,200,572

WEIGHT INDICATOR AND REGISTER FOR HOISTS

Jesse T. Bolen, Prineville, Oreg., assignor of one-half to William M. MacKay, Prineville, Oreg.

Application February 28, 1939, Serial No. 259,023

8 Claims. (Cl. 265—1.6)

This invention relates to improvements in weighing devices and pertains particularly to a weighing device which is designed for use in connection with hoists.

The present invention has for its primary object to provide a novel and improved weighing device by means of which loads lifted by a hoist may be accurately weighed and which does not require that any alterations be made in the construction of the hoist for putting the weighing device into use, the device being so designed that it may be mounted directly upon the boom or gib platform in a position where the hoist cable may be placed in contact with certain parts of the device.

Another object of the invention is to provide an improved weighing device for use in association with hoists, which will indicate and register the weight of the load lifted by the same, as soon as such load is swung free from the ground and will then be thrown out of operation so that a more or less direct pull between the hoist cable drum and the boom pulley may be established, so that the load lifting operation can proceed uninterrupted.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Fig. 1 is a view in side elevation of the mechanism embodying the present invention showing the same in working connection with a hoist.

Fig. 2 is a view similar to Fig. 1 showing the mechanism in its oscillated weighing position.

Fig. 3 is a view in top plan of the frame for the mechanism.

Fig. 4 is a detailed plan view of the one-revolution clutch.

Referring now more particularly to the drawing, Fig. 1 illustrates the application of the present weighing device wherein the numeral 1 indicates a suitable support such as the platform of a lifting boom or gib, upon which is also mounted the usual cable hoist drum 2, with which is connected the hoist cable 3. No details of construction of the hoist drum have been shown in view of the fact that this is standard structure and well known. The only alteration necessary in such drum structure is to provide the shaft 4 thereof with a suitable sprocket pulley 5 for connecting the drum with the weighing mechanism as hereinafter described.

The numeral 6 designates the boom or weight lifting part of the structure, over the free end of which boom the cable 3 passes in the usual well known manner.

The mechanism embodying the present invention comprises a base frame 7 which is secured to the platform 1 and which includes the two upwardly diverging pairs of arms 8 and 9. The arms 8 may be referred to as the forward pair of arms and the arms 9 as the rear pair. The individual arms of the pair 8 are each designated by the numeral 10 and those of the pair 9 are each designated by the numeral 11. The upper ends of the arms 9 are connected by a shaft 12 at the center of which is mounted a grooved pulley 13 and connecting the upper ends of the upwardly extending auxiliary arms 14 is a shaft 15 on which is mounted a grooved pulley 16 which is in opposed relation with the pulley 13. Between these pulleys 13 and 16 the cable 3 passes.

The arms 11 are connected together by a shaft 17 and mounted upon this shaft for oscillation thereon is a frame consisting of the two oscillatable arms 18 connected at their outer ends by the bar 19. The bar 19 rotatably supports a pressure pulley 20 which is grooved, as shown, and which is designed to rest upon the top of the cable 3 in the manner hereinafter described.

Secured to one end of the shaft 17 is a crank arm 21 which has formed integrally therewith the rearwardly extending pressure bar 22 while the free end of this crank arm has pivotally connected therewith one end of a connecting rod 23, the other end of which is pivotally attached, as at 24, with the crank disk 25 which is secured to a shaft 26 which extends transversely of the frame 7 adjacent the point of connection between the lower ends of the pairs of arms 8 and 9.

Adjacent the shaft 26 is a clutch supporting shaft 27 on which is mounted a one-revolution kick-off clutch mechanism indicated generally by the numeral 28, which is operatively coupled with the shaft 26 by the gears 27', 26', whereby, when the clutch mechanism is engaged or put into working position, it will impart one complete revolution to the shaft 26 and will then automatically disengage or "kick-off". Means for putting the clutch into engagement is provided in the form of the control rod 29 which is within easy reach of the operator of the hoist, and an operative or drive connection is established between the shaft 27 and the sprocket gear 5 by the sprocket chain 30 which couples the gear 5 with a suitable corresponding gear 31 connected with the shaft 27.

Any suitable type of clutch mechanism which will impart only a single revolution to the shaft 26 each time a load is to be weighed, may be employed. In Fig. 4 there is shown a form of mechanism by which this action may be accomplished, wherein there are shown the movable two clutch jaws 28ᵃ and 28ᵇ, both of which are mounted upon the shaft 27, the jaw 28ᵇ being freely rotatable thereon and connected with the sprocket wheel 31, while the jaw 28ᵃ is keyed to the shaft and is slidable longitudinally thereon relative to the free jaw 28ᵇ. The sliding jaw 28ᵃ is connected by a suitable shift lever L which in turn is coupled with the control 29, and this lever is normally held or forced to swing into one position by a spring S where the clutch jaws are disconnected. The clutch jaw 28ᵃ is normally pressed against a boss B in the face of which is formed a notch N, and this sliding jaw carries a tooth T, which is adapted to engage in the notch. In the operation of this clutch, when the operator pulls the clutch shifting bar 29, the lever L will shift the sliding jaw 28ᵃ into connection with the constantly rotating jaw 28ᵇ, the spring S becoming compressed. The lever is held by the operator until the tooth, which has been removed from the notch N, is rotated to the position where it will engage the face of the boss B. The control 29 may then be released and the tooth will be rotated against the face of the boss, the necessary rotary power being in the meantime transmitted to the shaft 27 and the shaft 26 for the actuation of the lever 21. When a complete revolution of the shaft 26 has been effected, the tooth T will drop back into the notch N, being forced into this position by the spring S and the clutch jaws will be disconnected.

Secured to a supporting bracket 32, which is coupled with one of the arms 18, is a weighing gauge indicated generally by the numeral 33. This weighing gauge may be of any suitable standard type employing a fluid pressure diaphragm which is enclosed within the housing portion 34 and which, when forced inwardly by a piston such as is shown at 35, will effect the turning of the indicator hand 36. In connecting this weighing gauge with the present apparatus, the piston 35 is joined to the pressure arm 22 by a collar 37 so that when the crank arm 21 is rocked down, an upward pressure will be exerted against the piston 35 to effect oscillation of the support 32 and the idler pulley 20 against the cable 3 and actuation of the gauge hand. It is preferred that this gauge be of the double hand type wherein one hand moves back and forth with the inward and outward movement of the diaphragm operating piston while the other hand will be left or held at the maximum point to which it is moved by the actuating hand. This second hand would indicate the weight of the load causing pressure to be applied to the diaphragm mechanism and after such weight has been read off, the second hand may be released to be returned to the initial position occupied by the first-mentioned or actuating hand. Since gauges of the type described are well known in the art, it has not been thought necessary to make any detailed showing of the operating mechanism therefor.

In addition to the fixed spaced pulleys 13–16 between which the cable 3 is passed, and the movable or pressure pulley 20 under which the cable passes, there may be provided the idler pulley 38 upon the shaft 17 across the top of which the hoist cable will pass.

In setting up the present weighing device for use, the hoist cable 3 will be disposed between the several pulleys in the manner described and as shown in Fig. 1. The two hands of the weighing gauge 33 will be in the zero position and the gauge actuating crank arm will be at its upper or maximum raised position.

When a load has been attached to the lifting end of the cable 3, as the same leaves the ground, the cable being wound up on the drum 2, the operator shifts the clutch control rod 29 so as to throw the clutch into gear. This will effect the transmission of rotary motion from the shaft 4 of the hoisting drum through the shaft 27 to the shaft 26 with which the crank disk is connected and will effect the rotation of the disk and the downward and upward swinging motion of the arm 21. As soon as the crank disk has made one complete revolution, the kick-off clutch will release itself so that no further turning motion will be imparted to the disk 25 and the arm 21 will be stopped in its raised position. When the arm 21 is swung down, upward movement will be imparted to the piston 35 and, through the piston and the diaphragm of the weighing gauge, the support 32 for the gauge and the arms 18, downward motion will be imparted to the pulley 21, forcing it against the cable 3 so as to loop the same down between the pulleys 13 and 38 in the manner illustrated in Fig. 2. The degree of resistance given to the downward movement of the pulley 20 by the cable 3, by reason of the load upon the end of the cable, will be measured in terms of pounds upon the dial of the measuring gauge 33, as the upward movement of the piston 35 will be resisted by the cable through the medium of the arms 18 and the parts 32 and 34, and thus the weight of the load on the cable will be indicated.

As previously stated, after the crank arm actuating disk 25 has made one revolution, it will be disengaged from the actuating clutch and the pressure pulley supporting frame will be restored to its raised position so that no further pull will be exerted by the pulley 20 upon the cable and the hoisting mechanism may then be operated in the usual manner for lifting the load to the proper or desired height.

From the foregoing, it will be readily apparent that the device embodying the present invention is of relatively simple construction and may be added to any mechanism of the type described without necessitating the making of alterations in the structure of such mechanism. While the present mechanism has been designed primarily for use in the logging industry for making an accurate check upon the weight of logs for the purpose of preventing overloading or underloading the log carrying trucks, it will be readily apparent that the device does not have to be restricted to such use as it may be readily used in other load lifting mechanisms.

What is claimed is:

1. In a hoist, including a weight lifting cable designed to be wound upon a rotating drum and passing from the drum over a boom, weighing means for the cable supported load, comprising a member supported for oscillation in an up and down arcuate path and overlying and adapted to bear down upon the cable, means for forcing said member downwardly upon the cable simultaneously with the rotation of the cable take-up drum and subsequently releasing the member, and a pressure actuated weight indicating mechanism operatively coupled with said member for indicating the weight supported by the cable through the resistance offered thereby to the downward movement of said member.

2. A weight indicating attachment for a lifting device, including a rotary drum and a load lifting cable having one end connected with the drum to be wound up thereon, comprising a pair of spaced supports over which the cable passes from the drum, a member supported for oscillation in an up and down arcuate path and arranged to rest upon and bear down on the cable between said supports, a pressure arm, a driving connection between said pressure arm and said cable drum whereby a rocking motion may be imparted to said arm, and a pressure indicating mechanism operatively coupled between said pressure arm and said oscillatable member for indicating the resistance offered to the downward movement of the oscillatable member by the cable when said pressure arm is moved to impart downward oscillation to the member through the medium of the indicating mechanism.

3. A load weighing attachment for lifting devices employing a load lifting cable having an end connected with a rotatable drum to be wound up thereon during the lifting operation, comprising a pair of spaced supports over which the cable is arranged to pass, a shaft disposed transversely of the cable, a frame unit rockably mounted on the shaft and including a pulley arranged to bear down on the cable between the supports, a pressure actuated registering unit supported upon said frame and including a piston which when moved in one direction will effect operation of the unit, a pressure arm, means supporting said arm adjacent to said unit for rocking movement, the arm having said piston connected therewith, and means for imparting rocking motion to said arm whereby to effect movement of said piston relative to the registering unit and the oscillation of said pulley against said cable.

4. A load weighing attachment for lifting devices employing a load lifting cable having an end connected with a rotatable drum to be wound up thereon during the lifting operation, comprising a pair of spaced supports over which the cable is arranged to pass, a shaft disposed transversely of the cable, a frame unit rockably mounted on the shaft and including a pulley arranged to bear down on the cable between the supports, a pressure actuated registering unit supported upon said frame and including a piston which when moved in one direction will effect operation of the unit, a pressure arm, means supporting said arm adjacent to said unit for rocking movement, the arm having said piston connected therewith, means for imparting rocking motion to said arm whereby to effect movement of said piston relative to the registering unit and the oscillation of said pulley against said cable, the said means for rocking said arm comprising a single revolution clutch mechanism, means for setting said clutch mechanism, and a driving connection between the clutch mechanism and said drum.

5. A load weighing device for use in association with a load lifting mechanism, including a lifting cable and a rotatable drum upon which one end of the cable is wound, comprising a frame structure, a pair of shafts supported in spaced relation by said frame structure and disposed transversely of said cable, an idler pulley carried by each shaft over which the cable passes, an oscillatable frame including a pair of arms each rockably mounted upon one of said shafts and a pressure pulley rotatably supported between the arms and arranged to bear upon the top of the cable between said first pulleys, a pressure registering gauge supported by said oscillatable frame to rock therewith, said gauge including a pressure piston by which registering action of the gauge is facilitated, a crank arm rockably mounted upon the said one of the shafts, a pressure arm coupled with the crank arm and connected with said piston to effect the movement of the latter toward the pressure gauge when the crank arm is rocked in one direction, and means for imparting a single rocking motion to the crank arm whereby a downward pressure may be imposed upon the cable between the first-mentioned pulleys by the pressure pulley through the medium of said gauge and piston.

6. A load weighing device for use in association with a load lifting mechanism, including a lifting cable and a rotatable drum upon which one end of the cable is wound, comprising a frame structure, a pair of shafts supported in spaced relation by said frame structure and disposed transversely of said cable, an idler pulley carried by each shaft over which the cable passes, an oscillatable frame including a pair of arms each rockably mounted upon one of said shafts and a pressure pulley rotatably supported between the arms and arranged to bear upon the top of the cable between said first pulleys, a pressure registering gauge supported by said oscillatable frame to rock therewith, said gauge including a pressure piston by which registering action of the gauge is facilitated, a crank arm rockably mounted upon the said one of the shafts, a pressure arm coupled with the crank arm and connected with said piston to effect the movement of the latter toward the pressure gauge when the crank arm is rocked in one direction, means for imparting a single rocking motion to the crank arm whereby a downward pressure may be imposed upon the cable between the first-mentioned pulleys by the pressure pulley through the medium of said gauge and piston, the said crank arm rocking means including a crank operatively connected with the crank arm, a single revolution clutch mechanism operatively coupled with said crank to impart rotary motion thereto, means for throwing said clutch mechanism into operation, and a drive connection between the clutch mechanism and said drum.

7. In a hoist including a weight lifting cable running from a winding drum over a boom, means for weighing a load on the portion of the cable suspended from the boom, comprising supporting guide means over which the cable passes, means movable relative to the cable to press the same down against and past said guide means, a rocking member, means for imparting a predetermined degree of rocking movement to said member, and a force measuring instrument operatively coupled between said rocking member and said cable pressing means for measuring the resistance of the cable to movement of the pressing means.

8. In a hoist including a weight lifting cable running from a winding drum over a boom, means for weighing a load on the portion of the cable suspended from the boom, comprising a pressure member mounted to bear down on the cable between the drum and boom, an arm operatively coupled with said pressure member, a rock member, an arm coupled with the rock member and disposed adjacent the first arm, a force measuring instrument operatively coupling said arms together whereby relative movement of the arms in one direction will effect the operation of the instrument, and means for giving a predetermined degree of rocking movement to the rock member to effect relative movement of the arms in the said direction and to move said pressure member downwardly against the cable, to measure the resistance by the cable to such downward movement of the pressure member.

JESSE T. BOLEN.